April 13, 1954     L. R. HEIM     2,675,279
BEARING
Original Filed Dec. 30, 1944
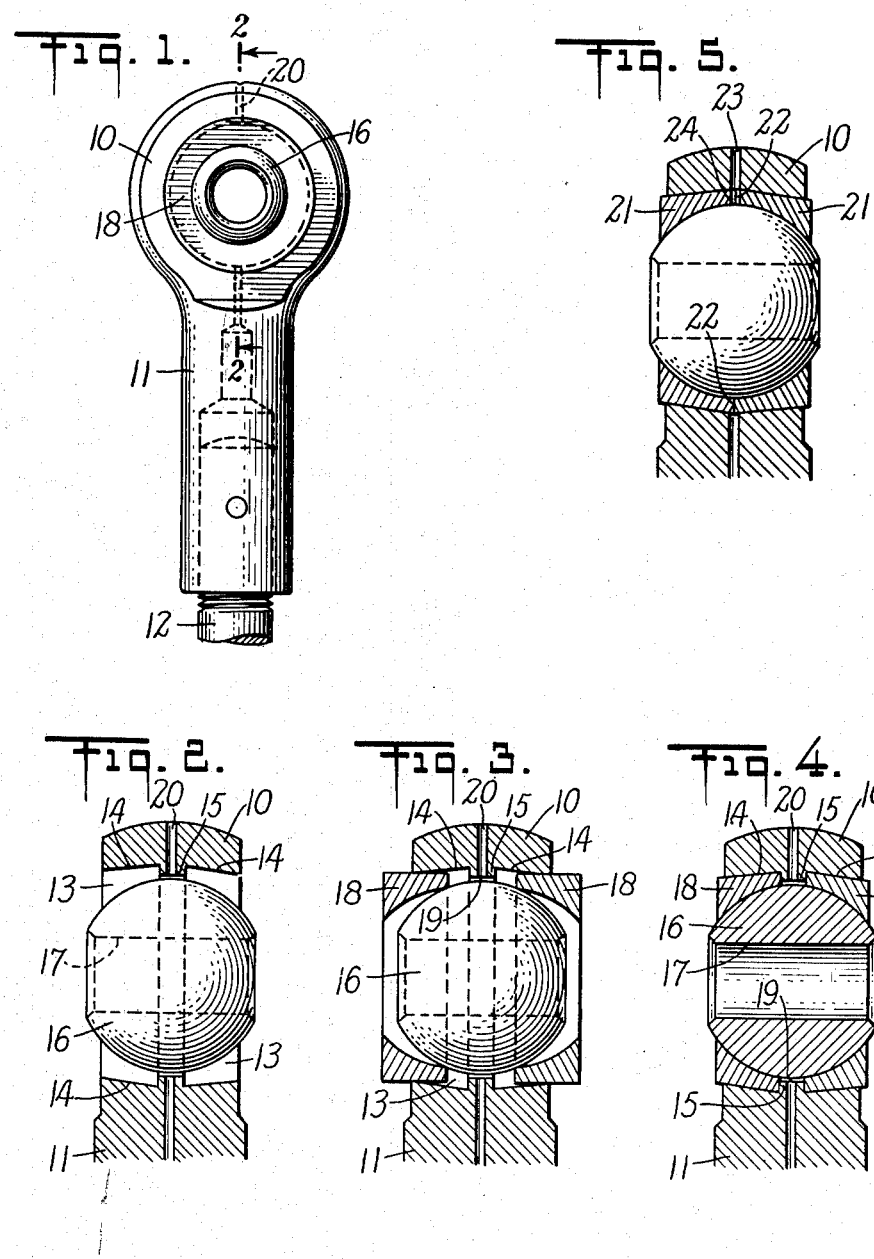
INVENTOR
*Lewis R. Heim*
BY
*Watson Johnson Leavenworth & Blair*
ATTORNEYS Patented Apr. 13, 1954

2,675,279

UNITED STATES PATENT OFFICE 2,675,279

BEARING

Lewis R. Heim, Fairfield, Conn.

Original application December 30, 1944, Serial No. 570,625. Divided and this application October 10, 1950, Serial No. 189,327

2 Claims. (Cl. 308—72)

This invention relates to bearings and the like, and is a division of my copending application Serial No. 570,625, filed December 30, 1944, now Patent 2,541,160, dated February 13, 1951 for "Method of Making and Assembling Bearings and the Like."

One of the objects of the present invention is to provide a practical bearing of strong and simple construction and highly efficient action. Another object is to provide a device of the above nature in which the component parts are dependably interlocked together and in which, nevertheless, the members having the bearing surfaces are permitted complete freedom of relative movement. Another object is to provide a method of making a bearing of the above nature characterized by simplicity and adapted to be carried on in a practical and efficient way in a minimum of time. Another object is to provide a practical method of assembling bearing elements in such manner as to insure freedom of relative movement in operation and yet dependable mounting in the part by which they are supported.

The invention accordingly consists in the features of construction, combination of elements, and arrangement of parts, all as will be exemplified in the structure hereinafter described, and the scope of the application of which will be indicated in the following claims.

Referring now to the accompanying drawing in which is shown one or more of various possible embodiments of the mechanical features of this invention—

Figure 1 is a side elevation of an embodiment of the invention in a so-called rod end bearing;

Figure 2 is a diagrammatic sectional elevation taken substantially along the line 2—2 of Figure 1 with certain parts omitted;

Figure 3 is a similar view along the same section showing the bearing at a later stage of its making;

Figure 4 is a similar view of the same section in complete form;

Figure 5 is a view similar to Figure 4 showing a somewhat modified construction.

Similar reference characters refer to similar parts throughout the several views of the drawing.

Referring to these drawings in detail, the part 10 is an outer housing or supporting member, in this embodiment acting as a rod end, and having formed thereon the shank 11 threaded to receive the end of rod 12. The ring-like portion 10 is merely illustrative of various forms of housing or supporting members in which the bearing is mounted and which may take a variety of forms without departing from the broader features of the invention. This part 10 is formed of a strong material such as steel or a suitable alloy and is provided with a central bore 13 extending therethrough. The wall of this bore or hole is preferably given a slight and gradual taper inwardly from each end toward the center, as indicated at 14, this taper resulting in an increase of diameter toward the center. Extending about the inner surface of the member 10 is an inwardly directed abutment 15 which is preferably integral with the ring 10, and the side walls of which rest in substantially parallel planes normal to the axis of the bore, and each of which accordingly forms an acute angle with the neighboring inclined surface 14.

Positioned within the bore, as shown in Figures 2, 3 and 4, is an inner bearing member 16, here shown as having a spherical bearing surface, and a bore 17 extending therethrough. This member 16 is preferably formed of hardened steel or the like with a smooth bearing surface adapting it for a running fit in the parts within which it rests.

A pair of annular bushings 18 is formed of any suitable material such as, for example, bronze which is malleable to such extent as to flow when subjected to pressure, later described, and yet not to yield under the compressions to which they are subjected in use. These bushings may be of the cross-section and relative size indicated in Figure 3 of the drawings and with the inner bearing member or ball 16 in position. The bushings are inserted as shown in Figure 3 and thereupon each subjected to heavy pressure in an axial direction and each inwardly from the ends of the bore 13. This pressure may be exerted by apparatus such as described and shown in the drawings of my Patent No. 2,366,668. The bushings may be successively forced into their ultimate position or they may move into such positions simultaneously and reach their ultimate position at the same time. As these bushings ride over and in engagement with the surface of member 16, they are expanded outwardly by the increasing diameter of successive transverse sections of the ball. This expanding action brings them into engagement with the respective walls of the abutment 15, their forward ends following a path which is not only axially inward, as above noted, but radially outward. The lateral surfaces or walls of the abutment form obtuse angles with respect to the adjacent surfaces of the member 16 over which the ends of the bushing 18 are expanded as they are forced inwardly. They accordingly are forced against these walls in a slightly inclined direction and hence the relative angle of these walls aids in forcing the ends of the bushings outwardly into tight interlocking relation to the inner surface of the part 10. As these bushings are driven home, there is a swaging action, as well as the above expansion, to bring them into a form and place where they tightly fill the entire space between the members 10 and 16 and closely interlock against outward axial movement with respect to the former. This wedging interlocking action holds the inner bearing member 16 against displacement in either axial direction due to the fact that the outer parts of the bushings fit and embrace the surface of the ball as shown in Figure 4.

The inner edge of the abutment 15 clears the outer surface of the ball 16 by a distance so small that the bushings will not enter the crevice thus provided. This space 19 accordingly forms a passage for lubricant entirely about the ball and may be supplied through an oil hole 20 with any desired well known means to close the outer end of the hole. These oil holes 20 may be formed also or alternatively from the end of the chamber in the shank 11, as indicated in Figure 1 of the drawings, the latter arrangement permitting the utilization of the end portions of the chamber for the storage of lubricant.

In Figure 5 is shown a variation of the bearing shown in Figure 4 in which the abutment 15 is dispensed with. In this case the two abutments 21 on being forced into position to meet each other at the central plane as along the line 22. The method of forming this embodiment is substantially identical with that hereinbefore described and it possesses certain advantages in the matter of simplicity and cheapness although lacking certain of the specific advantages of the form shown in Figure 4. The Figure 5 embodiment provides for lubrication by the oil hole 23 which is extended through the meeting ends of the bushings, as indicated at 24, so as to lead lubricant direct to the inner bearing member.

The side elevation of the device shown in Figure 5 is substantially identical with that shown in Figure 1 to represent the construction of Figure 4.

Due to the smooth surface of the inner bearing member and its relatively smaller diameter as compared with the inner surface of the ring 10, it may be turned within the bushings without turning the latter in the ring with which they are tightly interlocked. If desired, the tightness of the fit between the bushings and the inner bearing member may be relieved if the process is carried on as thus far described.

In the preferred method of carrying on my process I used the following procedure which is of value in various forms of bearings or similar devices. Before the parts are assembled the inner bearing member is heated to a temperature some hundreds of degrees above its normal surroundings but less than such temperature as would tend to draw the temper of or otherwise injure this part. This may be done by an oil bath or otherwise, and brings about a substantial expansion thereof. The ball thus heated is placed in position and the parts quickly assembled by the above process, it being understood that the outer parts, due to the absence of heating or difference of material, have no substantial tendency to shrink. Within the short time required to carry on such process, the ball does not appreciably shrink and yet soon afterward it resumes its normal temperature and shrinks so as to leave the desired clearance between its bearing surface and the inner surfaces of the bushings 18. The clearance desired, that is, the degree of relative shrinkage of the heated with respect to the unheated parts, may be controlled by the temperature used and made to bring about exactly the required degree of tightness or looseness of fit. This feature of the invention may obviously be carried on at extremely low cost and without delaying the remaining steps of the process, and not only expedites but adds to the closeness of fit between the bearing members.

It will thus be seen that there is provided a bearing in which the various objects of this invention are efficiently achieved. The parts are locked together with a maximum of security due to the wedging action exerted by the bushings 18, and yet the bearing runs with exactly the desired degree of freedom.

As various changes may be made in the various features of this invention, it is to be understood that the foregoing description and the showing of the accompanying drawing are to be interpreted as illustrative and not in a limiting sense.

I claim:

1. In bearing construction, in combination, a one piece member having a hole therethrough the inner surface of which is shaped to form a projecting rib extending circumferentially thereabout, said surface extending to a greater radial depth between its ends than at its ends and forming an acute angle with one side of said rib, a member gradually increasing in transverse diameter in directions from each end toward its center and forming surfaces of revolution, said member being positioned within said hole and having its surfaces at each side of said rib forming obtuse angles with the adjacent walls of said rib, and a pair of bushings force-fitted within said hole and fitting at their ends against opposite sides of said rib and at their inner surfaces with said surfaces of revolution of said inner member and each interlocking with said deeper portions of the inner surface of said hole.

2. In bearing construction, in combination, an outer one-piece housing member having a hole extending therethrough the radial depth of which varies to be greater at portions between than at its ends, means forming a circumferential abutment substantially centrally of said hole and between the ends thereof and having parallel side walls lying in planes normal to the axis of said housing member, both side walls of said abutment forming acute angles with the adjacent inner surface of said housing member, an inner bearing member disposed in said hole and having surfaces of revolution of increasing diameter in directions from its ends toward its center so as to form obtuse angles with said side walls, and a bushing of relatively malleable material force-fitted in said hole between said housing member and said bearing member and interlocking with adjacent inner surfaces of said housing member and also with said abutment side against relative movement in directions normal to said adjacent surface of the housing member.

References Cited in the file of this patent

UNITED STATES PATENTS

| Number | Name | Date |
|---|---|---|
| 2,047,885 | Riebe | July 14, 1936 |
| 2,382,773 | Chambers | Aug. 14, 1945 |
| 2,400,506 | Heim | May 21, 1946 |

FOREIGN PATENTS

| Number | Country | Date |
|---|---|---|
| 568,117 | Great Britain | Mar. 19, 1945 |